(12) United States Patent
Sonoda

(10) Patent No.: US 7,802,271 B2
(45) Date of Patent: Sep. 21, 2010

(54) DISK CLAMPING DEVICE

(75) Inventor: Yoshinori Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 549 days.

(21) Appl. No.: 11/918,603

(22) PCT Filed: Apr. 4, 2006

(86) PCT No.: PCT/JP2006/307125

§ 371 (c)(1),
(2), (4) Date: Oct. 16, 2007

(87) PCT Pub. No.: WO2006/134708

PCT Pub. Date: Dec. 21, 2006

(65) Prior Publication Data

US 2009/0077574 A1    Mar. 19, 2009

(30) Foreign Application Priority Data

Jun. 16, 2005    (JP) .............................. 2005-176730

(51) Int. Cl.
*G11B 17/04*    (2006.01)
(52) U.S. Cl. ..................................................... 720/706
(58) Field of Classification Search .................. 720/706, 720/619, 715, 652, 707, 622, 655, 610, 713, 720/604, 702, 696, 712

See application file for complete search history.

(56) References Cited

U.S. PATENT DOCUMENTS 5,586,105 A * 12/1996 Mizuno et al. ............... 720/708

6,198,716 B1    3/2001 Tamiya et al.

FOREIGN PATENT DOCUMENTS

| EP | 1 372 150 | 12/2003 |
| JP | 2002-329356 A | 11/2002 |
| JP | 2002-352496 A | 12/2002 |
| JP | 2003-281802 A | 10/2003 |
| JP | 2005-346833 A | 12/2005 |
| JP | 2006-202407 A | 8/2006 |

* cited by examiner

*Primary Examiner*—Allen T Cao
(74) *Attorney, Agent, or Firm*—Birch, Stewart, Kolasch & Birch, LLP

(57) ABSTRACT

A disk clamping device includes clamp pawls 3, which project from or retract into through holes 22 formed in a turntable 2 to be rotated and driven by a disk rotating-and-driving motor 1; a rotating-and-elevating member 3, disposed rotatably and in an ascendable and descendable manner in synchronism with the turntable 2, when going up, causing the clamping pawls 3 to project from the through holes 22, and when going down, causing the clamping pawls 3 to retract into the through holes 22; and clamp releasing levers 6, 7 pushing down the rotating-and-elevating member 3 against a pushing-up and urging force, wherein the turntable 2 has pawl-receiving part protrusions 24 forming clamp pawl receiving parts, which are protruded on the underside of the turntable and communicate with the through holes 22; and the rotating-and-elevating member 4 has protrusion receiving holes 42 formed thereon into which the pawl-receiving part protrusions 24 are fitted at the time of upward movement of the rotating-and-elevating member 4.

1 Claim, 3 Drawing Sheets

DISK CLAMPING DEVICE

TECHNICAL FIELD

The present invention relates to a disk clamping device, which clamps an information recording disk on a turntable of a disk reproducing device.

BACKGROUND ART

Hitherto, it is well-known that a disk clamping device including a turntable for mounting a disk, fitted on an output rotating shaft of a spindle motor; clamp pawls (chuck pawls) rotatably pivotably supported by the backside of the turntable, and projecting from and retracting into a plurality of through holes formed in the turntable; a rotating-and-elevating member disposed under the turntable, rotatably and in an ascendable/descendable manner in synchronism with the turntable, when going up, causing the clamp pawls to project from the through holes in a disk clamping direction and rotate them, and when going down, causing the clamp pawls to retract into the through holes; a pushing-up spring urging upward the rotating-and-elevating member; and a clamp releasing lever moving the rotating-and-elevating member in a pushing-down direction against an urging force of the pushing-up spring and in a pushing-down releasing direction (e.g., see Patent Document 1).

In such a conventional disk clamping device, pawl-receiving part protrusions, forming a clamp-pawl receiving part communicating with the through hole of the turntable, are integrally protruded on the underside of the turntable, in order to secure a receiving space of the clamp pawls at parts around the shaft of the turntable. In this way, the rotating-and-elevating member is arranged to go up and down between the turntable integrally having the downwards pawl-receiving part protrusions, and a dedicated spindle motor to drive the disk.

Patent Document 1: JP-A2002-329356 (right column of page 4 to left column of page 5, FIG. 1, and FIG. 5)

The conventional disk clamping device thus arranged as above confronts with a difficulty that the height of a disk reproducing part heightens on account of the presence of the pawl receiving part protrusions protruding from the underside of the turntable. In other words, the top of the rotating-and-elevating member abuts against the lower ends of the pawl-receiving part protrusions on the underside of the turntable at an elevated position of the rotating-and-elevating member by a spring, and therefore, a dead space is created between the turntable and the rotating-and-elevating member caused by the pawl-receiving part protrusions. The dead space heightens the height of the turntable from the spindle motor, and this hinders thinning of the disk reproducing part.

The present invention has been made to solve the above-mentioned problems, and an object of the present invention is to provide a disk clamping device including a disk reproducing part attaining easy thinning thereof though pawl-receiving part protrusions for forming clamp-pawl receiving parts are protruded on the underside of the turntable.

DISCLOSURE OF THE INVENTION

The disk clamping device according to the present invention includes a turntable for mounting a disk, fitted on an output rotation shaft of a motor for rotationally driving the disk; clamp pawls for clamping the disk, rotatably assembled in the turntable, and project from and retract into a plurality of through holes formed in the turntable; a rotating-and-elevating member, disposed on the backside of the turntable, rotatably and in an ascendable/descendable manner in synchronism with the turntable, when going up, causing the clamp pawls to project from the through holes in a disk clamping direction and rotate them, and when going down, causing the clamp pawls to retract into the through holes; an urging member pushing up and urging the rotating-and-elevating member; and a clamp releasing lever moving the rotating-and-elevating member in a pushing-down direction of the rotating-and-elevating member against an urging force of the urging member and in a pushing-down releasing direction thereof, wherein the turntable has pawl-receiving part protrusions, which are protruded on the underside of the turntable forming a clamp-pawl receiving part and communicate with the through hole; and the rotating-and-elevating member has protrusion-receiving holes formed therein into which the pawl-receiving part protrusions are fitted at the time of upward movement of the rotating-and-elevating member.

According to the present invention, since it is arranged such that at the time of upward movement of the rotating-and-elevating member, which causes the clamp pawls assembled in the turntable to rotate in a projecting and retracting direction into the through holes of the turntable, the pawl-receiving part protrusions, which are protruded on the underside of the turntable, are fitted into the protrusion-receiving holes formed in the rotating-and-elevating member, no a dead space is created between the rotating-and-elevating member and the turntable at the elevated position of the rotating-and-elevating member due to the pawl-receiving part protrusions. Thus, the height of the turntable from the motor for rotating and driving the disk lowers, thus actualizing thinning of the disk reproducing part.

BEST MODE FOR CARRYING OUT THE INVENTION

An embodiment of the present invention will now be described with reference to the accompanying drawings in order to explain the present invention in more detail.

First Embodiment

Figure 1:
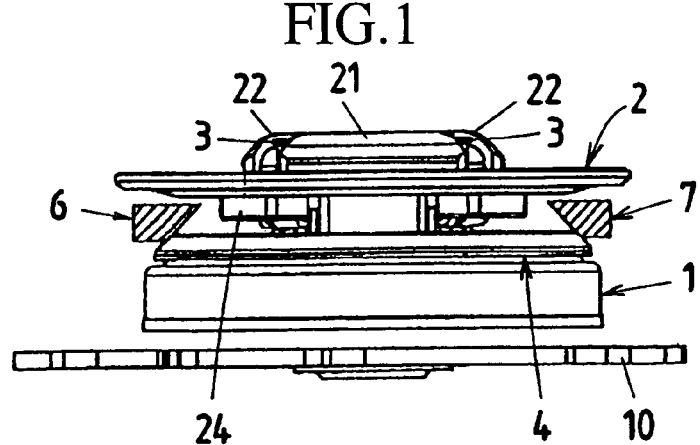
FIG. 1 is a side view showing a disk clamping device according to the first embodiment of the present invention in a disk unclamping state.
Figure 2:
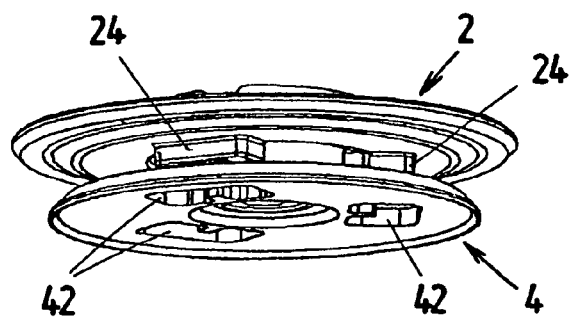
FIG. 2 is an oblique view of the turntable and the rotating-and-elevating member shown in FIG. 1, as seen from the under.
Figure 3:
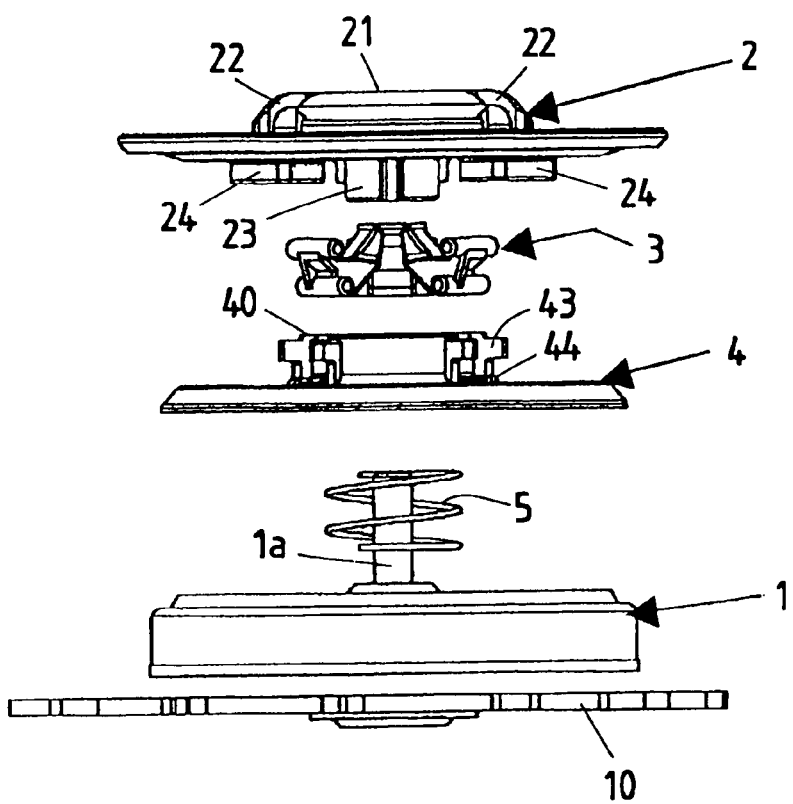
FIG. 3 is an exploded view of the device shown in FIG. 1.
Figure 4:
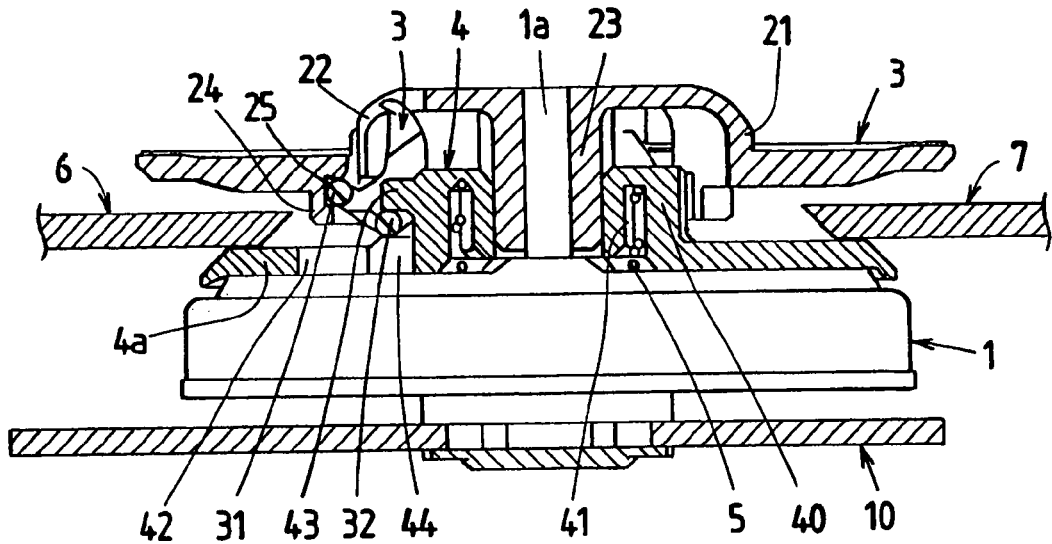
FIG. 4 is an enlarged sectional view of the device shown in FIG. 1.
Figure 5:
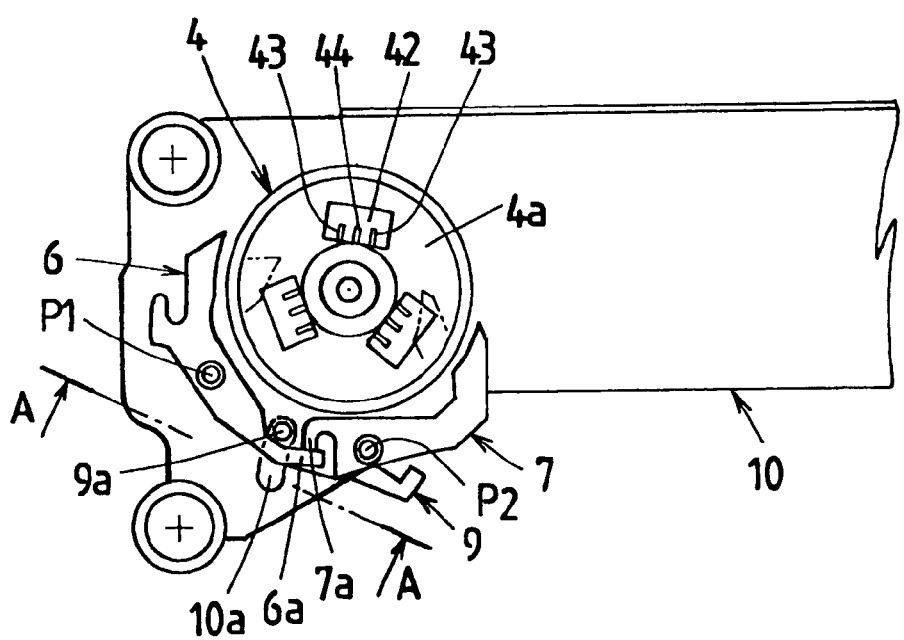
FIG. 5 is a plan view showing the state where the turntable shown in FIG. 4 is detached.
Figure 6:
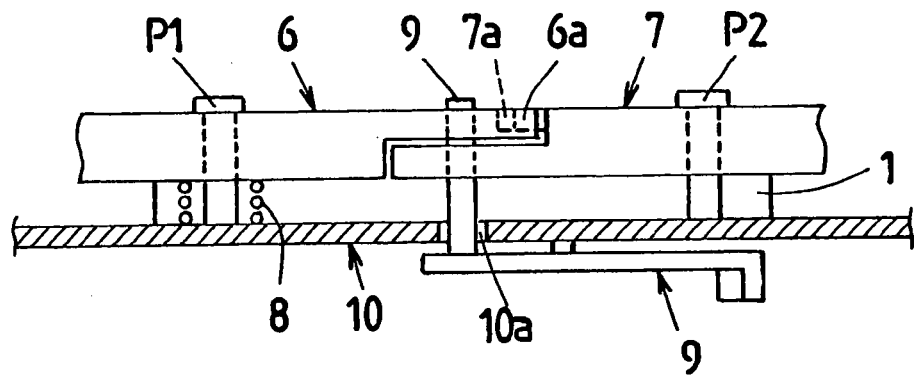
FIG. 6 is a sectional view taken along the line A-A of FIG. 5.
Figure 7:
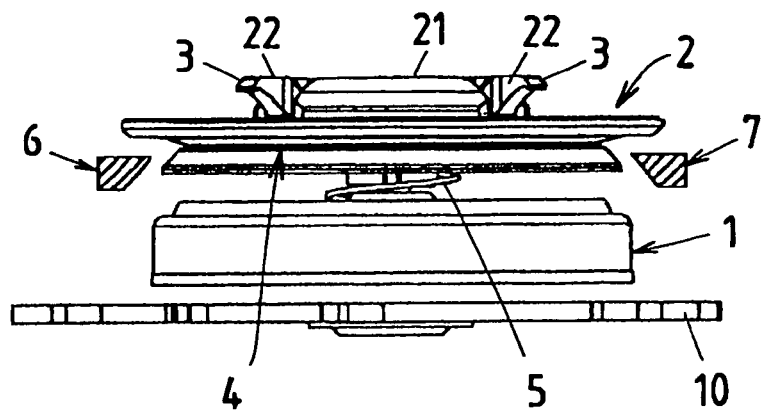
FIG. 7 is a side view showing a disk clamping state shown in FIG. 1.
Figure 8:
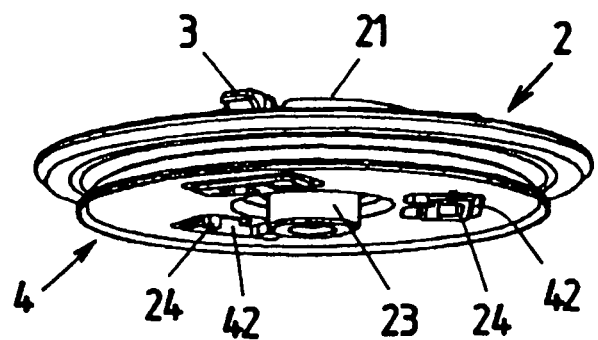
FIG. 8 is an oblique view of the turntable and the rotating-and-elevating member shown in FIG. 7, as seen from the under.

FIG. 1 is a side view showing a disk clamping device according to the first embodiment of the present invention in a disk unclamping state; FIG. 2 is an oblique view of the turntable and the rotating-and-elevating member shown in FIG. 1, as seen diagonally from the under; FIG. 3 is an exploded view of the device shown in FIG. 1; FIG. 4 is a sectional view of the device shown in FIG. 1; FIG. 5 is a plan view showing the state where the turntable shown in FIG. 4 is detached; FIG. 6 is a sectional view taken along the line A-A of FIG. 5; FIG. 7 is a side view showing the device in a clamping state of FIG. 1; and FIG. 8 is an oblique view of the turntable and the rotating-and-elevating member shown in FIG. 7, as seen from the under.

The disk clamping device shown in FIG. 1 is provided with a turntable 2 for mounting a disk, which is rotated and driven by a spindle motor 1 (disk driving-and-rotating motor). The turntable 2 has a boss 21 for fitting and holding the disk, shaped like inverse concavity in cross section, on the center of the surface of the turntable; a plurality of through holes 22 through which clamp pawls 3 (see FIG. 4), described later, project and retract, and which are provided circumferentially at predetermined intervals in the boss 21; and a central barrel-shaped shaft 23 (see FIG. 3 and FIG. 4), which is integrally protruded on the center of the backside of the boss 21, and is fitted around an output rotation shaft 1a of the spindle motor 1.

The clamp pawls 3 for clamping the disk, which project from and retract into the through holes 22 of the turntable, are rotatably assembled on the backside of such a turntable 2, and the clamp pawls 3 are arranged to be received in the backside of the boss 21 of the turntable 2. In order to secure a space for receiving the clamp pawls 3, a plurality of pawl-receiving part protrusions 24, forming clamp-pawl receiving parts communicating with the through holes 22, at positions corresponding to the through holes 22, are integrally protruded outwardly on the underside of the turntable 2, at predetermined intervals at outer parts around the central barrel-shaped shaft 23. Further, a circular plate-shaped rotating-and-elevating member 4 rotating synchronously with the turntable 2 is externally fitted in an ascendable and descendable manner in the central barrel-shaped shaft 23 of the turntable 2.

An upward central boss 40 is integrally formed in the rotating-and-elevating member 4, as shown in FIG. 3 and FIG. 4, the central boss 40 is fitted in the downwards central barrel-shaped shaft 23 of the turntable 2 in an ascendable and descendable manner, and the boss is engaged with the central barrel-shaped shaft 23 in parts around it, rotating the turntable 2 in connection with the rotating-and-elevating member 4 synchronously with each other, as previously stated. When such a rotating-and-elevating member 4 goes up, the central boss 40 of the rotating-and-elevating member is received into a concave space formed on the backside of the boss 21 of the turntable 2. Moreover, the central boss 40 has an annular groove 41 (see FIG. 4) of which lower end is opened, a spring 5 (urging member) is interposed between the spindle motor 1 and the rotating-and-elevating member 4 through the annular groove 41, and the rotating-and-elevating member 4 is pushed up and urged by the spring 5. Protrusion-receiving holes 42 are formed on the underside of the rotating-and-elevating member 4 for respectively fitting the pawl-receiving part protrusions 24 at an elevated position of the rotating-and-elevating member 4 by a pushing up and urging force of the spring 5.

Here, a detailed explanation is given of a mounting structure of the clamp pawls 3 and an interlock arrangement between the clamp pawls 3 and the rotating-and-elevating member 4. As shown in FIG. 4, a supporting shaft 31 and an engaging pin 32 are integrally formed on both basal sides of the clamp pawl 3 in parallelly separated condition, respectively, and the supporting shaft 31 is rotatably fitted and borne in an engaging groove 25 formed on an inner wall of the through hole 22 in the turntable 2. Additionally, engaging protrusions 43, 44 in pairs are integrally formed on the periphery of the central boss 40 of the rotating-and-elevating member 4, positioned correspondingly to the through holes 22; the engaging pin 32 of the clamp pawl 3 is fittingly engaged in these engaging protrusions 43, 44. The fitting engagement causes the clamp pawl 3 to rotate on the supporting shaft 31 following going up-and-down movements of the rotating-and-elevating member 4. It should be understood that it is only necessary for these engaging protrusions 43, 44 to be rotatably fit and hold the engaging pin 32 of the clamp pawl 3, and therefore, it is also possible to replace the above engaging protrusions 43, 44 with the rotating-and-elevating member 4 by forming a pin-engaging groove or a pin-engaging hole thereon, which permits a rotatable assemblage with the engaging pin part 32.

The disk clamping device thus arranged as above has a pair of clamp releasing levers 6, 7 pushing down the rotating-and-elevating member 4 against a pushing up and urging force of the spring 5. Here, units composed of the spindle motor 1, the turntable 2, and the rotating-and-elevating member 4 etc are mounted on a horizontally rotatable carrying arm 10, which is provided on the disk reproducing device and mechanically carries the turntable 2 to a disk reproducing position and a disk retracted position; and clamp releasing levers 6, 7 are rotatably pivotably supported by the carrying arm 10 through pins P1, P2 (see FIG. 5 and FIG. 6). Those clamp releasing levers 6, 7 are interlocked with each other between their rotatably supporting pins P1, P2, and have an urging force in a cramping releasing direction. That is, the clamp releasing levers 6, 7 have intersecting engaging-and-disengaging parts 6a, 7a, which alternately intersect each other and engage and disengage with each other at an intermediate of the rotatably supporting pins P1, P2.

Then, the one clamp releasing lever 6 is urged by a torsion spring (rotating and urging means) 8 shown in FIG. 6 in a clamping releasing direction, and in the urged state, the mutual intersecting engaging-and-disengaging parts 6a, 7a of the clamp releasing levers 6, 7 are arranged to be held in the abutting engagement state.

Here, the carrying arm 10 has a pin guiding hole 10a formed thereon; an engaging pin 9a provided on a rotating lever 9 interlocking with a mode switching mechanism of the disk reproducing device through the pin guiding hole 10a is abutting and engaging with the intersecting engaging-and-disengaging parts 6a, 7a of the clamp releasing levers 6, 7; and these clamp releasing levers 6, 7 are arranged to be rotated in a disk clamping direction against a rotating and urging force of the torsion spring 8.

The operation thereof will now be described below.

In the state where the turntable 2 on the carrying arm 10 is held at a retracting position within the casing of the disk reproducing device, the clamp releasing levers 6, 7 hold the rotating-and-elevating member 4 at a pushing-down position against a pushing up and urging force of the spring 5. Therefore, the clamp pawls 3 of the turntable 2 are held at the state where the pawls are retracted from the through holes 22 of the turntable 2. In this condition, the carrying arm 10 horizontally rotates interlocking with the mode switching mechanism of the disk reproducing device; the turntable 2 on the carrying arm 10 is carried from a retracting position to a disk reproducing position. When a disk (not shown) is mounted on the turntable 2, the rotating lever 9 of the system of the clamp releasing levers 6, 7 operate in response to a mounting-completion sensor signal, and thereby, the clamp releasing levers 6, 7 move back from on the rotating-and-elevating member 4 by an urging force of the torsion spring 8.

This backward movement thereof causes the rotating-and-elevating member 4 to go up by a pushing up and urging force of the spring 5, and thereby, the clamping pawls 3, which rotate following the rotating-and-elevating member 4, project from the through holes 22 and clamp the disk on the turntable 2. Thus, the upward movement of the rotating-and-elevating member 4 by a pushing up and urging force of the spring 5 causes the clamping pawls 3 to project from the through holes 22 and to clamp the disk on the turntable 2. However, at the time of upward movement of the rotating-and-elevating member 4, the central boss 40 of the rotating-and-elevating member 4 is received into concavity formed on the backside of the boss 21 of the turntable 2, and at the same time, as shown in FIG. 7 and FIG. 8, the pawl-receiving part protrusions 24 on the underside of the turntable 2 are fittingly received into the protrusion receiving holes 42 of the rotating-and-elevating member 4, the top of the base 4a of the rotating-and-elevating member 4 being held in the state where the top abuts the underside of the turntable 2.

And then, after the completion of reproduction of the disk, the rotating lever 9, the clamp releasing levers 6, 7 run on the rotating-and-elevating member 4 to push down the rotating-and-elevating member 4 against a pushing up and urging force of the spring 5 by driving against an urging force of the torsion spring 8. Following this downward movement of the rotating-and-elevating member 4, rotation of the clamp pawls 3 in a retracting direction from the through holes 22 releases the clamping engagement of the disk by the clamp pawls 3, thus enabling carrying out of the disk from on the turntable 2.

According to the first embodiment described above, although pawl-receiving part protrusions 24 forming the clamp pawl receiving parts are integrally protruded on the underside of the turntable 2, it is arranged that the rotating-and-elevating member 4, which is disposed under the turntable 2 rotatably and in an ascendable and descendable manner in synchronism with the turntable 2, and is urged in a pushing-up direction by the spring 5, has the protrusion receiving holes 42 in which the pawl-receiving part protrusions 24 are fitted at the time of upward movement of the rotating-and-elevating member 4 by a pushing up and urging force of the spring 5. Accordingly, at an elevated position of the rotating-and-elevating member 4, the pawl-receiving part protrusions 24 on the underside of the turntable 2 fit into the protrusion receiving holes 42 of the rotating-and-elevating member 4, as described above. This enables abutment of the top of the base 4a of the rotating-and-elevating member 4 with the underside of the turntable 2, and prevents creation of a dead space between the turntable 2 and the rotating-and-elevating member 4. Thus, the first embodiment lowers the height of the turntable 2 from the spindle motor 1 and realizes thinning of the disk reproducing part.

INDUSTRIAL APPLICABILITY

As mentioned hereinabove, the disk clamping device according to the present invention, though the pawl-receiving part protrusions for forming the clamp pawl receiving parts are protruded on the underside of the turntable of the device, the device is suitable for easy thinning of the disk reproducing part.

The invention claimed is:

1. A disk clamping device comprising:
    a turntable for mounting a disk, fitted on an output rotation shaft of a motor for rotationally driving the disk;
    clamp pawls for clamping the disk, rotatably assembled on the turntable, and projectable from a plurality of through holes formed in the turntable;
    a rotating-and-elevating member disposed on the backside of the turntable, rotatably and in an ascendable and descendable manner in synchronism with the turntable, when going up, causing the clamp pawls to project from the through holes in a disk clamping direction and rotate them, and when going down, causing the clamp pawls to receive into the through holes;
    an urging member pushing up and urging the rotating-and-elevating member; and
    a clamp releasing lever moving the rotating-and-elevating member in a pushing-up direction of the member against an urging force of the urging member and in a pushing-down releasing direction of the member;
    wherein the turntable has pawl-receiving part protrusions each forming a clamp-pawl receiving part which is protruded on the underside of the turntable, and communicates with the through hole; and the rotating-and-elevating member has protrusion-receiving holes formed thereon into which the pawl-receiving part protrusions are fitted at the time of upward movement of the rotating-and-elevating member.

* * * * *